July 26, 1938.  R. H. GUINZBURG  2,124,854
METHOD OF MAKING HOLLOW RUBBER ARTICLES
Filed Aug. 14, 1935  4 Sheets-Sheet 1
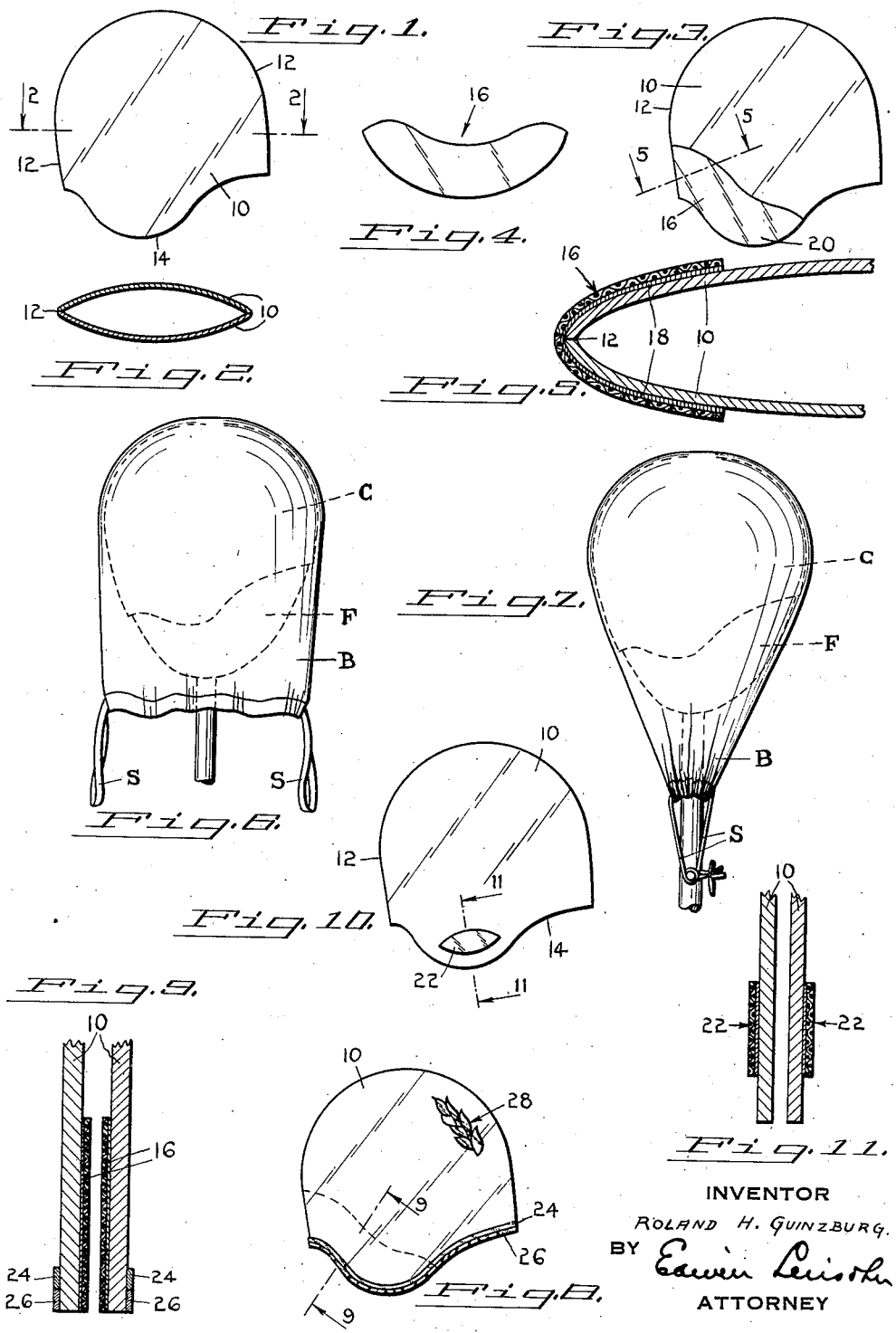
INVENTOR
ROLAND H. GUINZBURG.
BY Edwin Levinson
ATTORNEY July 26, 1938.  R. H. GUINZBURG  2,124,854
METHOD OF MAKING HOLLOW RUBBER ARTICLES
Filed Aug. 14, 1935  4 Sheets-Sheet 2
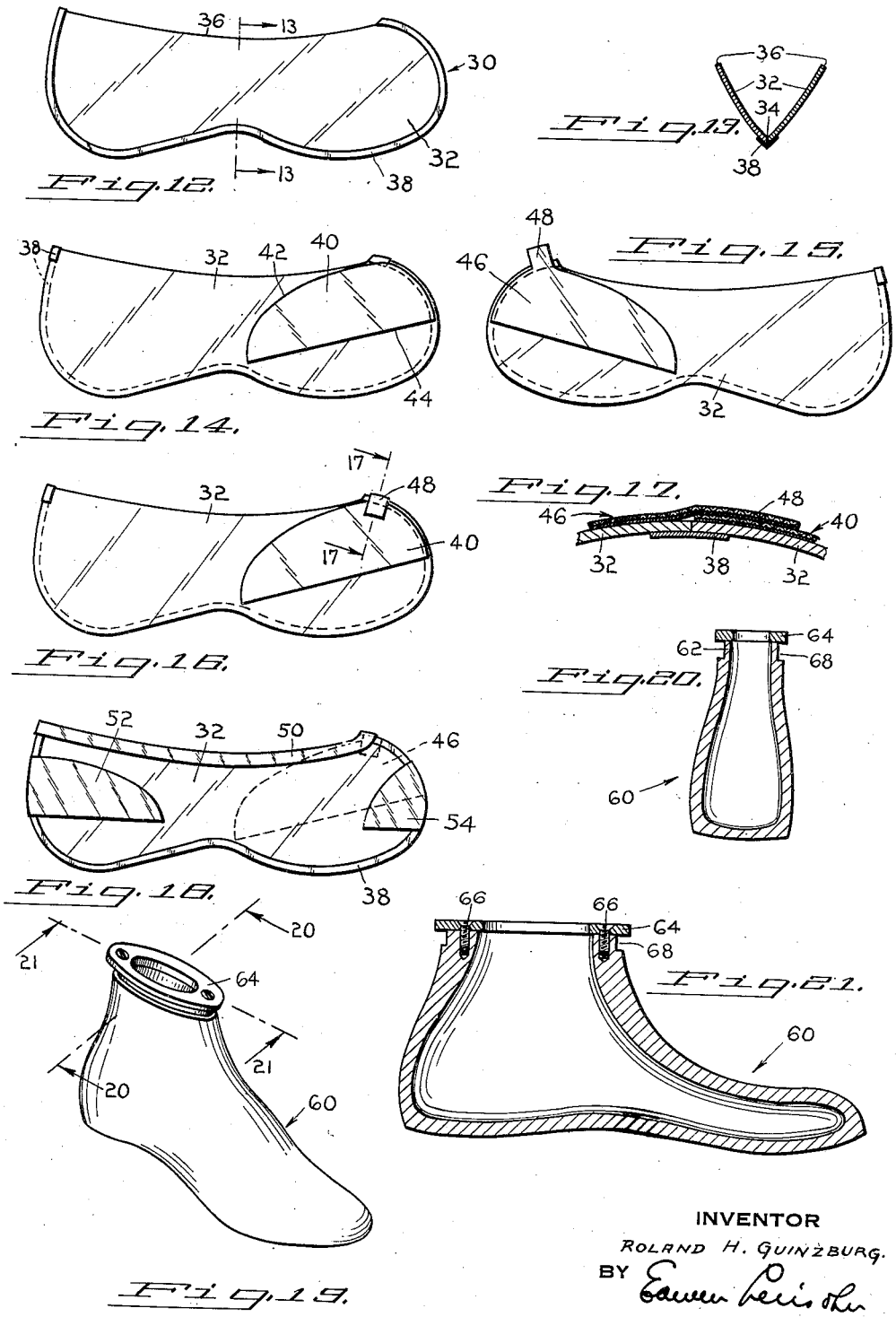
INVENTOR
ROLAND H. GUINZBURG.
BY
ATTORNEY July 26, 1938.   R. H. GUINZBURG   2,124,854
METHOD OF MAKING HOLLOW RUBBER ARTICLES
Filed Aug. 14, 1935   4 Sheets-Sheet 3

INVENTOR
ROLAND H. GUINZBURG
BY Edwin Levisohn
ATTORNEY

July 26, 1938.  R. H. GUINZBURG  2,124,854
METHOD OF MAKING HOLLOW RUBBER ARTICLES
Filed Aug. 14, 1935  4 Sheets-Sheet 4
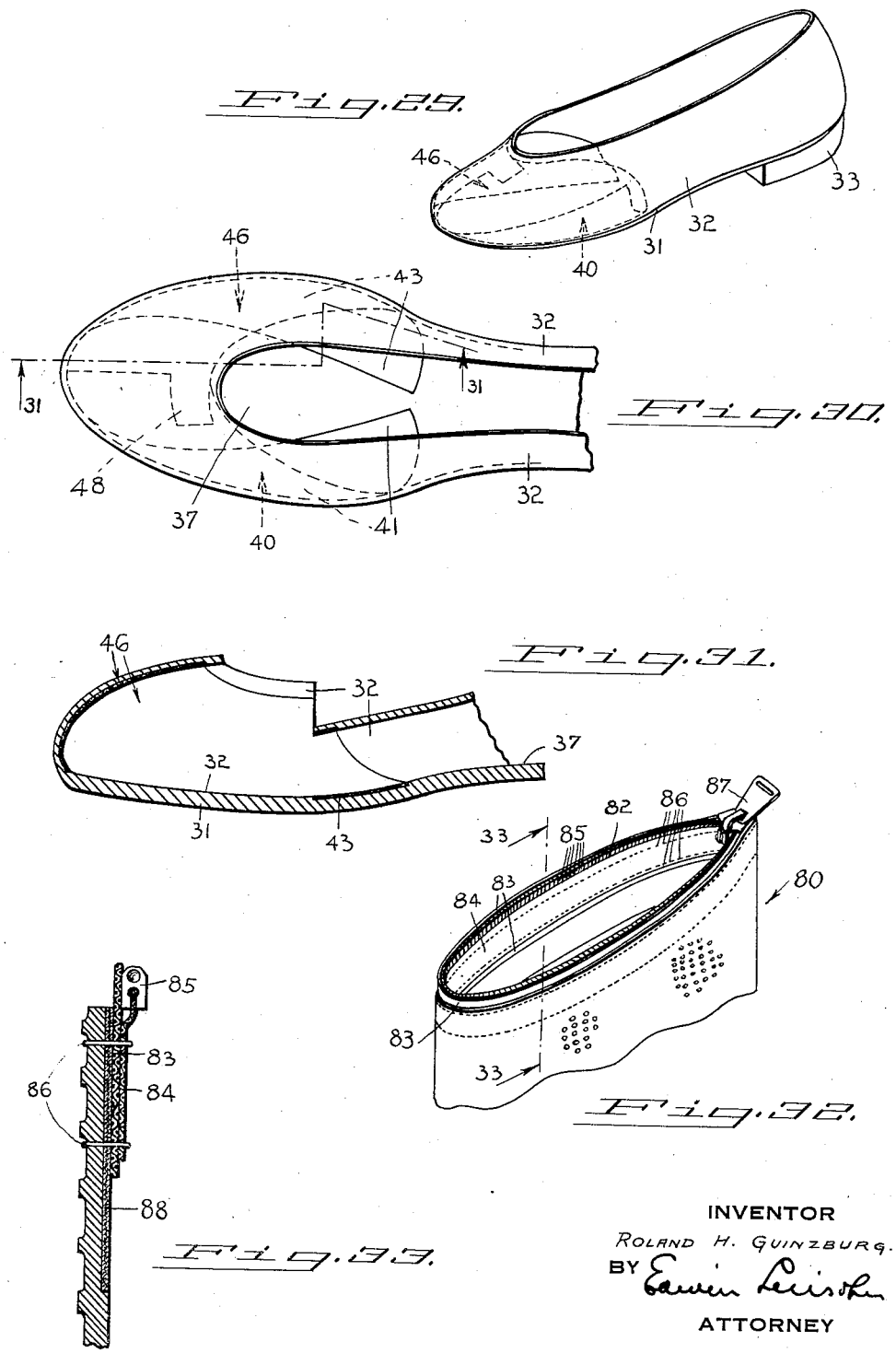
INVENTOR
ROLAND H. GUINZBURG.
BY
ATTORNEY Patented July 26, 1938

2,124,854

UNITED STATES PATENT OFFICE 2,124,854

METHOD OF MAKING HOLLOW RUBBER ARTICLES

Roland H. Guinzburg, Flushing, N. Y., assignor to I. B. Kleinert Rubber Company, New York, N. Y.

Application August 14, 1935, Serial No. 36,141

4 Claims. (Cl. 18—56)

The present invention relates to the manufacture of hollow rubber articles, such as bathing caps, bathing shoes, hot water or ice bags, etc.

One object of the invention is to provide such articles with lining or reinforcing layers securely united therewith without stitching.

Another object of the invention is to provide rubber bathing shoes with means to prevent certain portions thereof from stretching.

A further object is to provide an improved method of ornamenting bathing caps, bathing shoes and similar articles in contrasting colors.

A further object is the provision of a method by which the association of the linings, reinforcing layers, stretch-preventing means, or ornamentation with the respective articles is facilitated.

A yet further object is generally to improve the construction and appearance of hollow articles made of rubber or other vulcanizable material.

The above objects of the invention and other objects ancillary thereto will best be understood from the following description considered with reference to the accompanying drawings.

In the drawings:

Fig. 1 is a plan view of an unvulcanized rubber bathing cap, illustrating one step in the present method;

Fig. 2 is a section on the line 2—2 of Fig. 1, showing the cap partly opened;

Fig. 3 is a view similar to Fig. 1, illustrating another step in the present method;

Fig. 4 is a plan view of a lining with which the cap is provided;

Fig. 5 is an enlarged section on the line 5—5 of Fig. 3;

Fig. 6 is a side view of apparatus employed in the present method and illustrates a further step in the present method;

Fig. 7 is a view similar to Fig. 6, illustrating another step in the method;

Fig. 8 is a side view of the finished cap;

Fig. 9 is an enlarged section on the line 9—9 of Fig. 8, showing the cap partly opened;

Fig. 10 is a view similar to Fig. 1, illustrating the association of a reinforcing layer with the cap;

Fig. 11 is an enlarged section on the line 11—11 of Fig. 10;

Fig. 12 is a plan view of an unvulcanized bathing shoe upper in one stage of its manufacture according to the present method;

Fig. 13 is a section on the line 13—13 of Fig. 12, showing the sides of the shoe spread apart;

Figs. 14 and 15 are plan views of opposite sides of the shoe in another stage of its manufacture;

Fig. 16 is a view similar to Fig. 14, illustrating another step in making the shoe;

Fig. 17 is an enlarged section on the line 17—17 of Fig. 16;

Fig. 18 is a side view of the shoe upper illustrating a further stage in its manufacture;

Fig. 19 is a perspective view of a form constituting one part of the apparatus used in the present method;

Figure 27:
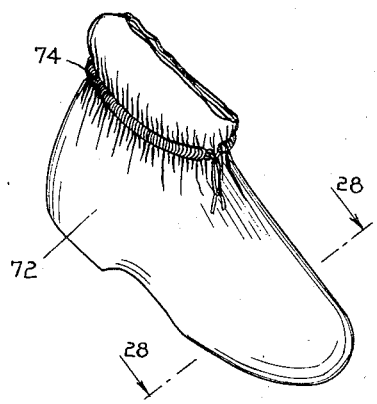
Figure 28:
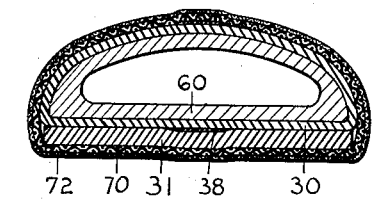
Figure 26:
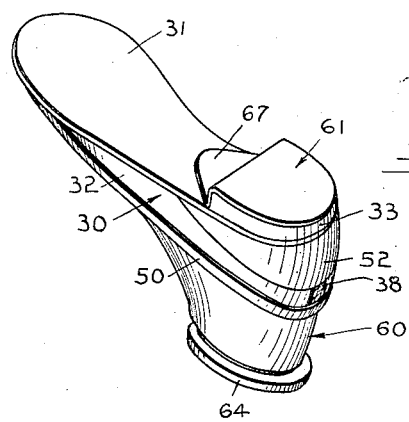

Figs. 20 and 21 are sections on the line 20—20 and 21—21 respectively of Fig. 19;

Figs. 22 to 25 are perspective views of parts of the apparatus used in conjunction with the form illustrated in Fig. 18;

Fig. 26 is a perspective view of the parts of the shoe assembled on the form;

Fig. 27 is a perspective view of the form and the associated parts assembled therewith;

Fig. 28 is an enlarged section on the line 28—28 of Fig. 27;

Fig. 29 is a perspective view of the finished shoe;

Fig. 30 is a top plan view, on an enlarged scale, of the forward part of the shoe;

Fig. 31 is a sectional view on the line 31—31 of Fig. 30;

Fig. 32 is a fragmentary perspective view of a bag embodying the present invention;

Fig. 33 is an enlarged sectional view on the line 33—33 of Fig. 2.

In accordance with the present invention the articles are preliminarily defined by appropriately shaped sheets of unvulcanized or partly vulcanized sheet rubber or other vulcanizable sheet material. For the sake of brevity and convenience in reference, the word unvulcanized, as used herein, will also designate the partly vulcanized rubber or other vulcanizable material.

In manufacturing a bathing cap according to the present method, two layers 10 of unvulcanized sheet rubber are united along their edges 12 completely therearound except at their bottom edges 14 which are free from each other to provide the head opening. This may be accomplished by subjecting two superposed sheets of unvulcanized sheet rubber to the action of a seaming and cutting die which simultaneously cuts the sheets 10 into the desired shape and unites the edges 12 thereof leaving the edges 14 ununited. Then a textile lining 16, preferably of the configuration shown in Fig. 4 is applied to the lower rear marginal portions of the layers 10, said lining extending from one side or layer 10 across the rear edge 12 to the other side or layer 10, as illustrated in Figs. 3 and 5. The inner surface 18 of the lining 16 is coated with a film of tacky rubber capable of being vulcanized with the material of the layers 10 and capable, prior to vulcanization, of adhesively securing the lining in position. The lining may be made of any suitable textile material but a knit material such as stockinet is preferred. Said knit lining is disposed so that it does not interfere with the circumferential elasticity or extensibility of the cap. Similarly, when the lining is made of woven material it should be cut on the bias and disposed so as not to interfere with the circumferential elasticity of the cap. The lining 16 also provides a reinforcement for the rubber at the lower side portions 20 to which fastening buttons or straps (not shown) may be attached. When the reinforcement only is desired, without the lining feature, relatively small pieces 22, which may be of the same material as the material of the lining 16, are applied as shown in Figs. 10 and 11. These pieces prevent the stitching or other securing means for the buttons or straps from tearing the rubber. After the lining layer 16 or reinforcing layers 22, as the case may be, are applied, the cap is turned inside out as illustrated in Figs. 8 and 9.

After the cap is turned and if ornamentation thereof in contrasting colors is desired, ornamental elements, here shown as strips 24, 26 and the ornamental form 28, each smaller or of less surface extent than the article, are applied to the exposed surface of the layers 10. Said ornamental elements are made of unvulcanized rubber coated on one surface with a film of tacky rubber capable of vulcanization and capable of retaining the elements in position at least until vulcanization of the cap.

At this stage of its manufacture, the cap is applied to a form on which it is molded, vulcanized, and, if desired, further ornamented. The apparatus which is preferred for these purposes is shown and described in my application Serial No. 36,140 filed August 14, 1935 for Apparatus for molding and ornamenting rubber articles. Figs. 6 and 7 illustrate parts of the apparatus which are utilized in the present method. Referring first to Fig. 6, the unvulcanized cap C provided with one or more of the lining, reinforcing, and ornamental elements described above, is applied to a hollow dome-shaped metal form F so that the cap snugly fits the form. Then a flexible member B here shown as a bag provided with draw strings S is applied over the cap C and the strings S are tightly drawn, as illustrated in Fig. 7, to cause the member B to exert pressure on the cap throughout its extent. While the cap C is thus held on the form F it is vulcanized, preferably by the action of a heating medium such as steam admitted to the interior of the form. At the same time the cap is molded to the shape of the form and the lining, reinforcing, or ornamental elements previously applied thereto are vulcanized to the body of the cap thus being firmly united therewith.

In the preferred mode of practicing the present invention in which the flexible member B is utilized as described above for exerting pressure on the cap and on the elements applied thereto, said flexible member constitutes means for forming relief patterns or designs in the surface of the cap in the manner described in my application referred to above. For this purpose the member B is made of flexible fabric woven, knitted or otherwise formed in a desired pattern or design. The pattern of this member will be impressed in the surface of the unvulcanized cap and will become permanent when the cap is vulcanized.

In manufacturing bathing shoes according to the present invention, the shoe 30 is preliminarily defined by two layers 32 of unvulcanized rubber united along edges 34 continuously therearound except at their top edges 36 which define the opening for insertion of the wearer's foot. A narrow strip 38 of unvulcanized rubber is applied over the united edges 34, being secured thereto by the action of a crimping roller well known in the art. Then the shoe is turned inside out and layers of textile material, which may be of the same material as that used for the bathing cap linings 16, are adhesively secured to the forward portions of the rubber layers 32. As shown in Fig. 14, the textile layer 40 is defined by an upper convex edge 42 and a lower straight edge 44 and is disposed substantially as shown with the forward part of the convex edge adjacent the front edge of the layer 32 and the straight edge 44 inclined downwardly and rearwardly toward the bottom of the layer 32 with the rear end of said edge 44 adjacent said bottom. As shown in Fig. 15, the textile layer 46 applied to the opposite layer 32 of the shoe is of substantially the same configuration as the layer 40 and is positioned in substantially the same way as the latter, but is provided with an integral tab 48. This tab is folded over the united edges 34 at the top of the shoe adjacent the front end of the shoe opening and is adhesively secured to the adjacent portion of the layer 40. Then the shoe is again turned to position said layers 40 and 46 inwardly of the shoe. When stockinet or other suitable knit material is used for the material of the layers 40 and 46, the latter are so cut that when they are positioned in the shoe, the material is substantially inextensible transversely of the shoe but is extensible longitudinally of the shoe. These layers 40 and 46 thus constitute means to prevent the shoe from stretching transversely or in the width but permit the shoe to stretch longitudinally.

After the shoe is turned to position the layers 40 and 46 inwardly thereof, it may be ornamented in the manner similar to that described above in connection with the bathing cap. Thus, referring to Fig. 18, ornamental elements comprising a narrow colored strip 50 of unvulcanized sheet rubber and colored pieces 52 and 54 of unvulcanized sheet rubber are adhesively united with the layers 32.

The shoe 30 in the condition illustrated in Fig. 18 is then applied to a form 60 such as that illustrated in Figs. 19 to 21. As here shown the shoe form 60 comprises a hollow metal, preferably aluminum, member 60 having a reduced upper edge 62 to which an annular plate 64 is connected by screws 66. Said plate and the reduced portion 62 define an annular groove 68, the purpose of which will appear presently.

Figure 24:
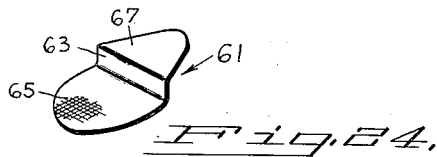
Figure 25:
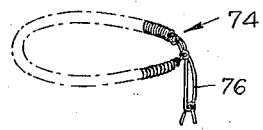

Referring to Fig. 26, after the shoe 30 is placed on the form 60, an outsole 31 of unvulcanized rubber is firmly united with the bottom of the shoe, and a heel 33 of unvulcanized rubber is applied to the sole 31. Then the metal heel plate 61 shown more clearly in Fig. 24 is placed over the heel 33. Said plate has a roughened surface 65 or carries a design or other configurations in relief for incorporating a corresponding surface configuration in the surface of the heel, a reflexed portion 63 which confines the breast of the heel and prevents it from extending into the shank portion of the sole when the rubber is softened, during vulcanization, and an offset portion 67 which overlies the shank of the outsole.

Figure 22:
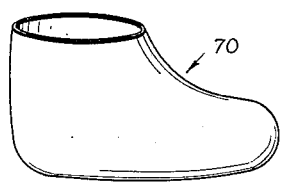
Figure 23:
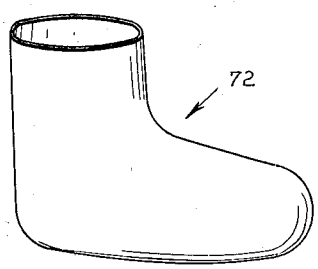

After the shoe 30, the outsole 31 and heel 33 are assembled together with the plate 61 on the form 60, the flexible member 70 here shown in the form of a sock, as illustrated in Fig. 22 is applied by drawing it over the assembly on the form. Said flexible member 70 has the same functions as the flexible member B utilized in the manufacture of the bathing caps and hence not only constitutes means to confine the assembly to the form but also constitutes a pattern-carrying member or design-impression element. When the flexible member 70 is knitted or woven in an open work design, the cover 72 illustrated in Fig. 23, of flexible closely woven or knitted material is utilized to prevent the rubber of the shoe from flowing through the openings and for confining the depth of the relief pattern to the proper degree. When the shoe is vulcanized under sand, said cover 72 also prevents particles of sand from reaching the shoe through the openings in the pattern carrying-member. The pattern carrying-member 70 and the cover 72 are drawn tightly over the assembly on the form 60 and are retained in position by the annular spiral spring 74 (Fig. 25) which engages the cover 72 and the underlying member 70 in the groove 68. The spring 74 is provided with cord terminals 76 to facilitate the application to and removal of the spring from the assembly on the form.

The assembled parts of the shoe, on the form 60 and confined thereto by the plate 61, the flexible pattern carrying member 70, and the cover 72, as illustrated in Figs. 27 and 28, are then vulcanized, preferably under sand pressure. The shoe thus produced, with the exception of the ornamentation which has been omitted for the sake of more clearly illustrating the inner construction of the shoe, is illustrated in Figs. 29 to 31. It will be noticed that the sole 31 is merged with the adjacent portions of the layers 32 and that the textile layers 40 and 46 have been merged with the inner surface of said layers 32 on the bottom 37 of the shoe and in the forward vamp or toe portion of the upper, the rubber coating of said layers 40 and 46 being vulcanized to the layers 32. The reinforcing strip 38 also merges with the layers 32 and outsole 31 and becomes substantially invisible in the finished shoe. The portions 41 and 43 positioned on the bottom of the shoe and the adjacent side portions of the upper in the forward part of the shoe are so disposed with respect to their knitted courses as to prevent the sides of the shoe upper from stretching transversely while permitting them to stretch longitudinally of the shoe.

In Figs. 32 and 33 the invention is illustrated as applied to a water bag 80 of the type which is provided with a closure 82 of the "zipper" fastener type. The stringers 83 and 84 which carry the well known zipper fastener elements 85 are stitched internally of the bag by lines of stitching 86. To prevent the rubber from being torn by the stitching under the forces exerted on the stringers when the closure slide 87 is operated to open and close the bag, a reinforcing layer or member 88 is interposed between the stringer 83 and the internal wall of the bag. Said member 88 comprises a sheet of woven textile material coated with a film of tacky rubber on both sides which is vulcanized to the wall of the bag, thereby firmly uniting said material with the wall of the bag. The method of making this bag will be obvious from the above description of the method as applied to the bathing caps and shoes, but it may be indicated that the reinforcing layer 88 is adhesively applied to the bag 80 before the latter is vulcanized and that the bag is vulcanized on a form, a suitable pattern-carrying member similar to the flexible member B being applied over the assembly on the form to hold the parts in position during vulcanization and to impress the relief design on the outer wall of the bag. After the bag is vulcanized, the stringers 83 and 84 are stitched thereto at the portion to which the reinforcing layer 88 is secured.

While I have shown and described several embodiments of the invention, it will be understood that the invention is capable of other embodiments and that each of the embodiments herein shown and described may be altered within the scope of the appended claims. It will be understood also that certain one or more steps in the method may be used without others and that unless otherwise specified the steps may be performed in an order which differs from the order of their recitation in the claims.

Having thus described the invention, what I claim and desire to secure by Letters Patent of the United States is:

1. The method of making a hollow rubber article which comprises preliminarily defining the article from unvulcanized sheet rubber, applying to said article on the exposed surface thereof a layer of ornamental material capable of being vulcanized thereto, said layer being of less surface extent than said article placing the said article and layer on a form, applying a flexible pattern-carrying member over the assembly on the form to press said assembled parts against the form whereby simultaneously to unite said parts and to impress the pattern of said flexible member on the outer surfaces of said layer and of said article and to shape the latter to the contour of the form, vulcanizing said assembly while thus held under pressure on the form, and then removing said pattern-carrying member.

2. The method of making a hollow rubber article which comprises preliminarily defining the article from unvulcanized sheet rubber, applying to the outer surface of said article an ornamental element of material capable of being vulcanized thereto and of a color which contrasts with the color of said article, said ornamental element being of less surface extent than said article, placing said article and the attached ornamental element on a form with the ornamental element exposed, applying a flexible pattern-carrying member over the article and its ornamental element and exerting pressure thereon to press the assembled parts together against the form whereby to simultaneously unite said parts and to impress the design of said pattern-carrying member on the outer surfaces of said article and of said ornamental element, and vulcanizing said assembled parts while under pressure on the form.

3. The method of making a hollow rubber article which comprises preliminarily defining the article from unvulcanized sheet rubber, applying to said article a layer of material capable of being vulcanized thereto, turning said article so that said layer is disposed in the interior thereof, applying to the outer surface of said article an ornamental layer of material of contrasting color capable of being vulcanized thereto, said ornamental layer being of less surface extent than said article applying a flexible pattern-carrying member over the article on the form and exerting pressure thereon to press the article against the form whereby to simultaneously unite said layers with said article, and to shape them to the contour of said form and to impress the design of said pattern carrying member on the outer surface of said article and said last mentioned layer, and vulcanizing the article while held under pressure on the form.

4. The method of making a hollow rubber article which comprises preliminarily defining the article from unvulcanized rubber, applying to said article a reinforcing layer of textile material having a coating of vulcanizable material thereon with said coating in contact with the surface of said article, applying to the exposed surface of said article an ornamental layer of less surface extent than said article, placing the article and the applied layers on a form, applying a flexible pattern-carrying member over the assembled parts on the form and exerting pressure thereon to hold the assembled parts snugly against the form to impress the design of said pattern-carrying member on the outer surfaces of said article and of said ornamental layer and to firmly unite said layers with said article, and vulcanizing the assembled article and layer while thus held on the form.

ROLAND H. GUINZBURG.